United States Patent
McGillivray et al.

(10) Patent No.: US 6,692,656 B1
(45) Date of Patent: Feb. 17, 2004

(54) AMPHOTERIC MAGNESIUM BUFFERS

(75) Inventors: Shawn R. McGillivray, Reno, NV (US); Mark A. Shand, Findlay, OH (US); Thomas M. Miller, Walnut, CA (US)

(73) Assignee: Premier Chemicals, LLC, King of Prussia, PA (US)

( * ) Notice: Subject to any disclaimer, the term of this patent is extended or adjusted under 35 U.S.C. 154(b) by 0 days.

(21) Appl. No.: 09/666,900

(22) Filed: Sep. 20, 2000

Related U.S. Application Data

(63) Continuation-in-part of application No. 09/282,380, filed on Mar. 31, 1999, now abandoned.
(60) Provisional application No. 60/080,281, filed on Apr. 1, 1998.

(51) Int. Cl.$^7$ ............................ C09K 3/32; A62C 35/00; C01B 11/46
(52) U.S. Cl. ...................... 252/192; 252/193; 252/184; 252/185; 252/194; 423/554
(58) Field of Search ................................ 252/194, 184, 252/185, 192, 193, 408.1; 423/265, 522, 554, 635

(56) References Cited

U.S. PATENT DOCUMENTS

| | | | |
|---|---|---|---|
| 3,994,821 | A | 11/1976 | Seidenberger |
| 4,233,175 | A | 11/1980 | Delmon et al. |
| 4,264,570 | A | 4/1981 | Sakolov et al. |
| 4,707,348 | A | 11/1987 | Schuiling |
| 4,724,132 | A | 2/1988 | Fabry |
| 4,865,761 | A | 9/1989 | Mandel et al. |
| 5,021,226 | A | 6/1991 | Ueno et al. |
| 5,342,543 | A | 8/1994 | Morris et al. |
| 5,474,602 | A | 12/1995 | Brown et al. |
| 5,814,291 | A | 9/1998 | Kelkar |

*Primary Examiner*—Joseph D. Anthony
(74) *Attorney, Agent, or Firm*—Ostrolenk, Faber, Gerb & Soffen, LLP

(57) ABSTRACT

A method of using a mixture as an amphoteric buffer is disclosed comprising mixing sulfuric acid, magnesium oxide and/or magnesium hydroxide, and water to form an amphoteric buffer, and applying the buffer to a spill of an acid or alkali so as to neutralize the spill.

12 Claims, No Drawings

AMPHOTERIC MAGNESIUM BUFFERS

CROSS-REFERENCE TO RELATED APPLICATIONS

This application is CIP and claims priority of U.S. patent application Ser. No. 09/282,380, filed Mar. 31, 1999, now abandoned, and U.S. Provisional Application No. 60/080,281, filed Apr. 1, 1998, which are herby incorporated by reference.

BACKGROUND OF THE INVENTION

1. Field of the Invention

The present invention relates to a magnesium-based amphoteric buffer that safely adsorbs and treats many kinds of spills and vapors and is produced from an optimal mixture of magnesium oxide (magnesia) or magnesium hydroxide, sulfuric acid and water to yield a product that neutralizes both acids and bases.

2. Description of the Prior Art

Many techniques in the prior art deal with liquid spills. Some rely on sorbent (i.e., absorbent or adsorbent) materials to soak up liquid spills. If the absorbed material is acidic or basic (alkaline), the spill may require neutralization. Neutralization frequently relies on inefficient chemical reactions or on reagents capable of neutralizing only an acid or a base but not both.

Prior art teaches the use of blends of chemicals that overcome this limitation. For example, one such blend comprises magnesia, such as MAGOX® 93 LR 325, and Epsom salts ($MgSO_4 \cdot 7H2O$) in a ⅓ to ⅔ weight ratio, respectively. This blend is sold under the tradename "pH 9" by Terra Environmental and is capable of neutralizing both acids and bases. Magnesia reacts with acids and Epsom salt reacts with alkalis. A serious drawback of this composition is a tendency to form a hard "cake" under certain storage conditions. For example, heat can dehydrate Epsom salt and hydrate magnesia into a hard cake. Alternatively, magnesium oxysulfate can form and create salt bridges between oxide particles.

A need persists for a non-caking amphoteric buffer that combines good neutralizing capacity with good storage properties, especially under warm or humid conditions.

SUMMARY OF THE INVENTION

The present invention relates to a method of using a magnesium-based amphoteric buffer that safely absorbs and treats many types of spills or vapors, and is resistant to hardening and caking while being stored. The amphoteric buffer of the present invention is described as an efficient and effective neutralizer of both acids and bases.

In a broad aspect, the amphoteric buffer comprises a basic magnesium compound and partially hydrated magnesium sulfate. Basic magnesium compound can neutralize acidic spills, and partially hydrated magnesium sulfate can neutralize alkali spills. Their combination can thereby render both acidic and alkali spills reasonably safe to handle.

One aspect teaches an amphoteric base formed by mixing sulfuric acid with an excess stoichiometry of magnesium hydroxide and/or magnesium hydroxide. Water may be added as needed to adjust the hydration of the resultant magnesium sulfate. Importantly, hydrated magnesium sulfate should comprise little or no Epsom salt, and preferably will comprise magnesium sulfate monohydrate. Conveniently, one or more pH indicators may be added to the buffer.

DESCRIPTION OF THE PREFERRED EMBODIMENTS

A magnesium-based amphoteric buffer can be produced by the direct addition, with mixing, of an appropriate quantity of sulfuric acid and water, to magnesium oxide and/or magnesium hydroxide. This produces, in-situ, a mixture of magnesium sulfate in various states of hydration, and magnesium oxide and/or hydroxide depending on whether magnesium oxide or magnesium hydroxide is used as an ingredient. For convenience, magnesium oxide and magnesium hydroxide shall hereafter be referred to as either "basic magnesium compound" or "magnesia."

Sulfuric acid is added directly to magnesia during manufacture of the material. The use of standard, readily available, commercial strength sulfuric acid permits economical and cost effective production of the material. Water may be added in a separate addition to adjust the hydration of the final product. Importantly, magnesium sulfate should be substantially present in non-hydrated form or in a hydrated form other than Epsom salt, that is, the fully hydrated form of magnesium oxide having seven water molecules. The amphoteric buffer of the present invention provides good absorbency, neutralizes both acids and bases, stores without caking, and is economically manufactured.

The direct addition of sulfuric acid to magnesia, in the manner described herein, avoids intermediate compounds and additional steps as described in the prior art. The fundamental reaction producing partially hydrated magnesium sulfated is as follows:

$$\text{MgO (and/or MgOH)} + H_2SO_4 + xH_2O = MgSO_4 \cdot yH_2O \qquad (1)$$

wherein x and y are integers greater than zero. Preferable, y is 1–5 and, more preferably, y is 1–3.

Magnesia should be used in excess of a stoichiometric amount so that a mixture of partially hydrated magnesium sulfate and magnesia results. The number of waters of hydration (y) combined with magnesium sulfate is dependent upon the quantity of water added as a reactant. Not all of the reactant water (x) become associate with the magnesium sulfate. For example, some water is lost due to steam generation during the reaction and a minor amount can hydrate magnesium oxide to magnesium hydroxide.

This mixture is amphoteric because it is capable of neutralizing both acids and alkalis. Depending on the type of spill, neutralization means either increasing or decreasing the spill's pH to a range safe for handling, usually from about 4–10. Magnesia can neutralize acids with the reaction products being the magnesium salt of the acid and water. Reaction (2) is representative of a reaction occurring during a spill clean-up of hydrochloric acid.

$$\text{MgO (and/or MgOH)} + 2HCl = MgCl_2 + H_2O \qquad (2)$$

Magnesium sulfate is capable of reacting with alkaline solutions, which have a pH above the precipitation point of magnesium ion, for example, sodium hydroxide, lime slurries and ammonia solutions. This reaction results in the removal of hydroxyl ion from solution by precipitation of magnesium hydroxide. Reaction (3) is representative of a reaction occurring in a spill of caustic soda.

$$MgSO_4 + 2NaOH = Mg(OH)_2 + 2NaSO_4 \qquad (3)$$

This buffering effect produces a neutralized material with a resultant pH from about 9–10, which is significantly less dangerous than that of the un-neutralized acid or alkali.

Incorporating at least one pH indicator into the buffer gives a visual check as to whether the spill has been neutralized to a safe pH level. The indicator serves to improve the effective use of the material for application on corrosive materials without complicating the training required for proper use. Convenient pH indicators include methyl orange, ethyl orange, azoviolet, methyl red, bromothymol blue and thymol blue. Some indicators can be used in combination, for example, (a) methyl orange and azoviolet, (b) ethyl orange and azoviolet, and (c) methyl red, bromothymol blue and thymol blue. Other indicators and combinations may be used, and the invention is not limited to those described. Any indicator or combination that visually shows pH changes is acceptable. The amount of indicator(s) in the product can vary depending on the desired color intensity.

A key feature of the invention is ensuring that magnesium sulfate is hydrated in the correct range. Excessive hydration tends cause caking in the product upon storage at elevated temperatures. Correct hydration will enable the product to remain free-flowing indefinitely under proper storage conditions. Correct hydration also lessens heat formation during spill clean-up of acidic solutions. To ensure correct hydration, water is preferably added during production after the addition of sulfuric acid. The method of the present invention, as described above, makes it possible to control manufacture of the final material in an economical and efficient manner. Compositions, which are hydrated at less than equilibrium amounts, will tend to generate heat when mixed with aqueous solutions, for example, during spill clean-up. Such exothermic reactions can be undesirable. On the other hand, compositions, which are hydrated at or near equilibrium amounts, that is, Epsom salt, tend to harden under certain ambient environmental or clean-up conditions. Hardening is often undesirable. The specific composition range of the present invention reduces undesirable exothermic or hardening scenerios, which could be found during storage or application. The method employed during manufacture increases control of the type and range of compositions produced while reducing the cost of production.

Hydrated magnesium sulfate of the present invention can be formed from reactants comprising by weight percent: sulfuric acid (98% concentration) 15–35%, preferably 20–30%, most preferably about 25%; magnesia 55–75%, preferably 60–70%, most preferably about 65%; and water 5–20%, preferably 5–15%, most preferably about 10%. The process aims to produce a product that is approximately two-thirds magnesium oxide and one-third $MgSO_4.xH_2O$. The percentages may be adjusted in a known manner such as using different dilutions of reagents.

The preferred method of production is the combination of magnesia with sulfuric acid and water in a suitable mixer, such as Hobart or screw mixers. The material can be processed batchwise or continuously. The preferred purity of magnesia is between 60–100%. Sulfuric acid of 98% concentration is preferred, but other concentrations of sulfuric acid can also be used, preferably from 50–98%. The sulfuric acid is preferably added in a controlled manner to reduce heat generation and with sufficient mixing to ensure rapid dispersal of the acid in the body of the mixture. Water can be added to the mixture after acid addition. After water addition, a pH indicator can be incorporated into the mixture.

Other additives may be added to produce differing neutralization functions of the final material. All such additions should occur before sizing of the magnesium oxide product. Sizing can be accomplished by any known apparatus, such as a ball mill. The size of the resultant particles should be large enough to avoid dusting, but small enough to permit rapid reaction with the spill.

EXAMPLE 1

Preparation of Magnesium-based Amphoteric Buffers #1–3

The following preparations were carried out by mixing the ingredients in a Hobart mixer. In order to yield one-third magnesium oxide and two-thirds magnesium sulfate in the final product, an appropriate quantity of sulfuric acid was slowly added to a magnesia containing product, including MAGOX® 93 LR 325 (a finely ground chemical grade of magnesium oxide produced from selected Nevada magnesite ores by burning to a relatively low reactivity to minimize moisture adsorption), BASIFLUX® (a coarse magnesium oxide produced from Nevada magnesite ores by burning to a relatively high reactivity), or BRUCIMAG®-200 (a naturally occurring form of magnesium hydroxide). Specifically, 729 g MAGOX® 93 LR 325 was reacted with 271 g of 98% sulfuric acid to yield Amphoteric Buffer #1. Also, 1000 g BASIFLUX® was reacted with 370 g of 98% sulfuric acid to yield Amphoteric Buffer #2. Further, 1000 g BASIFLUX®-200 was reacted with 318 g of 98% sulfuric acid to yield Amphoteric Buffer #3. Table 1 describes the chemical composition of the various magnesia products as well as the chemical composition of the prior art amphoteric buffer, "pH 9."

TABLE 1

| | Chemical Analysis (As-Is Basis) | | | |
|---|---|---|---|---|
| CHEMICAL | MAGOX ® | BASIFLUX ® | BRUCIMAG ® | pH 9 |
| LOI @ 400° C. | 5.34 | 5.63 | 20.83 | 31.05 |
| MgO | 71.53 | 54.84 | 55.40 | 44.02 |
| $SiO_2$ | 0.78 | 8.34 | 1.31 | 0.89 |
| $Fe_2O_3$ | 0.44 | 1.25 | 0.69 | 0.34 |
| $Al_2O_3$ | 0.22 | 2.12 | 0.31 | 0.25 |
| CaO | 3.6 | 4.62 | 1.75 | 1.34 |
| $SO_3$ | 18.02 | 22.60 | 19.64 | 22.0 |

The reactions generated considerable quantities of heat, with temperatures reaching in excess of 150° C. After each of the products had cooled to room temperature, it was ground to remove any lumps that formed during the reaction and checked for pH using Universal indicator solution. The indicators detected "hot spots," which slowly disappeared over several days, presumably because the reaction with magnesia was still continuing and was not one hundred percent complete after all the acid had been added to the magnesia. In separate experiments, dilution of the sulfuric acid to 80% with water resulted in complete reaction of the acid with magnesia, as no "hot spots" were detected. Apparently, more water in the reaction accelerates the process.

X-ray diffraction of "pH 9" revealed the presence of only magnesium oxide and Epsom salts ($MgSO_4.7H_2O$). In contrast, x-ray diffraction of Amphoteric Buffers #1–3 showed the formation of magnesium sulfate monohydrate ($MgSO_4.H_2O$). Calcium sulfate was also noted in Buffers #1–3. Importantly, magnesium oxide did not hydrate to magnesium hydroxide as a final product in Buffers #1–3 even when 80% sulfuric acid was used.

EXAMPLE 2

Neutralization Testing

The ability of Amphoteric Buffers #1–3 as well as "pH 9" to neutralize both acids and alkalis was evaluated by reacting each with concentrated sulfuric acid (98%) or 50% caustic soda until neutralization was complete. The final pH was checked using indicator solution. All the above formulations were capable of neutralizing both sulfuric acid and caustic soda when the formulations were applied in excess of the stoichiometric quantity required for neutralization.

EXAMPLE 3

Product Storage Hardening Testing

Amphoteric Buffers #1–3 as well as "pH 9" were checked for their ability to resist "caking" under hot storage conditions. Each was heated in a sealed vial in a convection oven at 140° F. The samples were probed on a regular basis to check for "cake" formation.

The "pH 9" formulation hardened at 140° F. after approximately 15 hours. Amphoteric Buffers #1–3 showed no signs of hardening after two weeks at 140° F.

EXAMPLE 4

Preparation of Magnesium-based Amphoteric Buffer #4

Amphoteric Buffer #4 was prepared by placing 66 wt. % magnesium oxide in a mixer, adding 25 wt. % sulfuric acid (98% concentration) and mixing. Water at 9% was later blended to the mixture. Indicators for pH were added at 35 g per one hundred pounds of finished product. When tested as described in Example 2, Amphoteric Buffer #4 was capable of neutralizing both sulfuric acid and caustic soda when applied in excess of the stoichiometric amount required for neutralization.

Obviously, numerous modifications and variations of the present invention are possible. It is, therefore, to be understood that within the scope of the following claims, the invention may be practiced otherwise than as specifically described.

What is claimed is:

1. A process for using a mixture comprising a basic magnesium compound and a partially hydrated magnesium sulfate as a caking-resistant amphoteric buffer, the process comprising applying the amphoteric buffer to neutralize spills wherein the partially hydrated magnesium sulfate is selected from the group consisting of $MgSO_4 \cdot xH_2O$, where x is at least one and less than seven.

2. The process of claim 1, wherein the partially hydrated magnesium sulfate comprises magnesium sulfate monohydrate.

3. The process of claim 1, wherein the amphoteric buffer comprises a weight ratio of basic magnesium compound to hydrated magnesium sulfate from about 3:1 to 1:3.

4. The process of claim 3, wherein the weight ratio is about 2:1.

5. The process of claim 1, wherein the amphoteric buffer comprises at least one pH indicator.

6. The process of claim 5, wherein the pH indicator is selected from the group consisting of methyl orange, ethyl orange, azoviolet, methyl red, bromothymol blue and thymol blue.

7. A process for neutralizing a spill comprising:

mixing sulfuric acid with a molar excess of a basic magnesium compound to form an amphoteric buffer consisting essentially of a basic magnesium compound and hydrated magnesium sulfate selected from the group consisting of $MgSO_4 \cdot xH_2O$, where x is at least one and less than seven; and applying the amphoteric buffer to the spill.

8. The process of claim 7 further comprising adding water to adjust hydration of hydrated magnesium sulfate.

9. The process of claim 7, wherein the basic magnesium compound comprises magnesium oxide.

10. The process of claim 7 further comprising adding at least one pH indicator to the amphoteric buffer before adding the amphoteric buffer to the spill.

11. The process of claim 7, wherein the amphoteric buffer is formed from 15–35 wt. % sulfuric acid, 55–75 wt. % basic magnesium compound and 5–20 wt. % water.

12. The process of claim 11, wherein the buffer is formed from about 25 wt. % sulfuric acid, 66 wt. % basic magnesium compound and 9 wt. % water.

* * * * *